March 26, 1957  A. SENKOWSKI ET AL  2,786,403
DRAFT CONTROL MEANS FOR TRACTOR IMPLEMENT HITCHES
Filed Oct. 16, 1953  2 Sheets-Sheet 1

INVENTORS.
ALEXANDER SENKOWSKI,
WITOLD CZARNOCKI &
FREDERICK D. COOPER
BY
Carlson, Pitzner, Hubbard & Wolfe
ATTORNEYS.

March 26, 1957  A. SENKOWSKI ET AL  2,786,403
DRAFT CONTROL MEANS FOR TRACTOR IMPLEMENT HITCHES
Filed Oct. 16, 1953  2 Sheets-Sheet 2

INVENTORS.
ALEXANDER SENKOWSKI,
WITOLD CZARNOCKI &
FREDERICK D. COOPER
BY
Carlson, Pitzner, Hubbard & Wolfe
ATTORNEYS.

2,786,403

DRAFT CONTROL MEANS FOR TRACTOR IMPLEMENT HITCHES

Alexander Senkowski, Earlsdon, Coventry, Witold Czarnocki, Coventry, and Frederick D. Cooper, Stoke, Coventry, England, assignors to Massey-Harris-Ferguson (Sales) Limited, a British Company Application October 16, 1953, Serial No. 386,616

Claims priority, application Great Britain October 17, 1952

12 Claims. (Cl. 97—46.07)

The present invention relates to power elevatable implement hitches for tractors and the like, and more particularly, to draft control hitches. Such hitches effect an automatic raising or lowering of an implement carried by them in response to changes in the draft forces on the implement and in a manner such that a selected draft is maintained substantially constant.

A basic system for such automatic draft control is disclosed in the Ferguson U. S. Patent 2,118,180 issued May 24, 1938, wherein a hitch linkage trailingly, pivoted at the rear end of a tractor is swung vertically by power means, such as a hydraulic ram receiving pressure fluid from a pump through suitable control means, for example, a valve. An implement is carried by the hitch with the freedom to rock fore and aft about a transverse axis under the combined influence of its own weight and any rearward ground reaction or draft forces. A top thrust link is operatively connected from the implement to a spring biased control element which resists the forward thrust of the link as occasioned by the tendency of the implement to rock forwardly. The endwise position of the link is determined, for any given thrust, by deflection of the bias spring. Additionally, an operative connection is made between the control element and the control valve such that the two move in sympathy, resulting in the raising or lowering of the hitch and implement to maintain the thrust on the link at a constant, predetermined value. Such thrust is, in the last analysis, variable with the magnitude of the ground reaction or draft forces on the implement, so that under uniform soil conditions the working depth of the implement is maintained substantially constant.

It is contemplated that the same hitch be used for a wide variety of implements such as single or multiple bottom plows, disc harrows, spring toothed cultivators, planters, and the like, and in all types of soil ranging, for example, from sandy loam to sticky gumbo. Manifestly, the draft forces set up and applied to the spring biased control element vary widely with such changing operating conditions. That is, a given slight change in the soil depth for the several different implements may create widely different changes in the net thrust on the link, owing to the different geometry and weight distribution of the implements, different forms of their ground working components, and also the different consistencies of the soils encountered. As a result, some implements may be sluggishly controlled, some controlled too rapidly so as to hunt, and some controlled with exactly the desired action.

It has been previously proposed that in order to overcome this difficulty, sensitivity adjustment means be provided for such draft control systems. "Sensitivity" as thus known and here used is the ratio of displacement of the control element to the thrust force exerted on the thrust link necessary to produce such displacement. In another aspect, sensitivity is an expression for the speed or rapidity with which the hitch control system responds to a given change in the controlling thrust to raise or lower the implement to such working depth that the controlling thrust is restored to its original preselected value. By increasing the sensitivity of the system, therefore, an implement otherwise sluggishly controlled may be given the proper action; by decreasing sensitvity, an implement otherwise too rapidly controlled may be given the optimum automatic draft control action.

Sensitivity adjustment means may be built in as an integral part of the draft control system, for example, as shown and claimed in the copending Bunting United States application Serial No. 97,640, filed June 7, 1949 (now patent No. 2,715,863). Alternatively, a separate outside sensitivty adjustment attachment may be provided which has the advantage that it may be applied to existing tractors, or applied only to those tractors which are to be used under the varying conditions indicated above. One advantageous form of such latter type sensitivity adjustment means is disclosed and claimed in the copending Klemm and Bunting United States application Serial No. 144,618, filed February 17, 1950 (now patent No. 2,721,509).

The present invention has as one of its general aims the provision of a new and improved draft control system which is susceptible of adjustments in its sensitivity of control.

A primary object of the invention is the provision of such a system having means for adjusting its sensitivity wherein a given change in the mechanical advantage of a coupling mechanism provides a much greater change in sensitivity than heretofore obtained, thereby adapting the system for optimum performance under extremely diverse conditions.

More specifically, it is an object of the invention to provide a draft control system having sensitivity adjustment means wherein the thrust-opposing resilient member is deflectable relative to the shiftable control element, so that changes in the mechanical advantage with which the resilient member works do not affect the ratio of corresponding displacements for the thrust link and the shiftable control element.

A further object is to provide a draft control system including a mechanism susceptible of adjustment in mechanical advantage and in which the sensitivity of the system varies as the square of changes in the mechanical advantage.

Still another object of the invention is the provision of means mountable on a tractor and connectable with its existing hitch control without destroying the original, or necessitating a change in, the hitch geometry, and which are adjustable to vary the sensitivity of the draft control system in the same manner as if the resilient control element were bodily substituted for a stronger or a weaker one.

An additional object of the invention is to provide such improved sensitivity adjustment means which are simple, compact, and economical in both organization and construction, and which are easily applied to reconstruct any hitch of the general type described in the aforementioned Ferguson Patent 2,118,180.

Other objects and advantages will become apparent as the following description proceeds, taken in conjunction with the accompanying drawings, in which.

Figure 1:
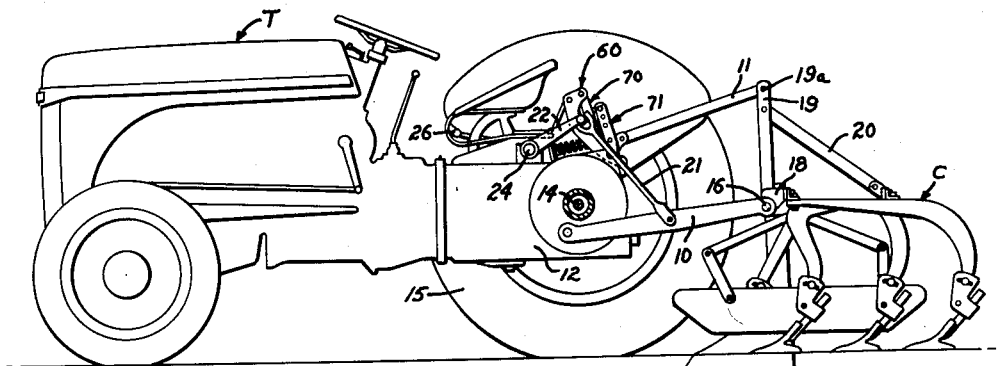
Figure 1 is a side elevation of a tractor (partially broken away for clarity) equipped with an implement hitch, an exemplary implement, and having a draft control system constituting a preferred embodiment of the present invention.

While the invention has been shown and is described in some detail with reference to a particular embodiment thereof, there is no intention that it thus be limited to such detail. On the contrary, it is intended here to cover all modifications, alterations, and equivalents falling within the spirit and scope of the invention as defined by the appended claims.

Referring now to the drawings, the invention has been illustrated in an installation in which attachments are provided for a familiar form of tractor T now on the market. Such attachments coact with the existing elements of the tractor, and particularly its hydraulic draft control mechanism, in such manner that an essentially new combination results. The invention can, of course, be employed by constructing a complete system embodying it rather than by modifying an existing one. The latter has, however, been chosen for illustration since it has the added advantage of making possible conversion of existing tractors.

The existing system

The tractor T and its hitch control system which are to be converted will first be described, although briefly, since they will be familiar to those skilled in the art as embodied in the "Ferguson" tractor. The rear implement hitch comprises a pair of lower hitch links 10, commonly called draft links, and a top or thrust link 11. The draft links 10 are arranged in side-by-side, forwardly converging relation, being pivotally secured at their forward ends for universal swinging movement relative to the center housing 12 of the tractor at points below and slightly forward of rear axles 14. The latter extend in opposite transverse directions from the center housing 12 to drive the tractor's pneumatically-tired rear traction wheels 15.

For purposes of illustration, a ground working implement, here shown as a cultivator C, is indicated as attached by suitable swivel connections to the aft ends of the draft links 10. Such attachment is made by connecting pins or studs 16, carried by transversely extending brackets 18 in the implement frame, and inserted through apertured balls swiveled in the rear ends of the draft links 10. This permits the implement to tilt fore and aft about the axis of the pins 16 within the limits imposed by the thrust link 11, as will appear presently. A vertically upstanding bracket or A-frame 19, reinforced by struts 20, is also carried by the implement frame. The bracket 19 is adapted at its upper end for pivotal connection with the rear end of the thrust link 11, as shown, a transverse pin 19a being inserted through apertures in the frame and an apertured ball swiveled at the trailing end of the link 11.

The draft links 10 are sustained and adjustably positioned by drop links 21 depending from crank arms 22 rigid with and projecting radially from a transverse rockshaft 24 journaled on the housing 12 of the tractor T. For rotating the rockshaft 24 and thus raising or lowering the draft links 10 and the implement C carried by them, a hydraulic ram 25 (Fig. 2) is located within the housing 12 and operatively connected with the rockshaft 24. Not only is the ram 25 controlled in response to draft forces on the implement C for automatic positioning of the latter to retain a draft load selected by setting a quadrant lever 26, but the latter also serves to effect elevation of the implement into transport position or lowering into working position.

Figure 2A:
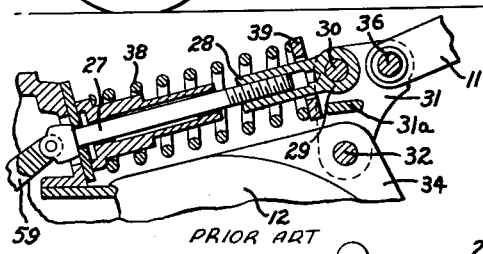
Fig. 2a is a fragmentary sectional view of a part of the existing draft control system of a well known tractor prior to its reconstruction into the present improved system illustrated by Fig. 2.

In the existing system (Fig. 2a) a shiftable control element 27, here shown in the form of a rod, is slidably carried by the tractor housing 12, having a threaded extension 28 screwed onto its rear end and providing an eye 29 which is pivotally received on a pin 30 inserted through openings at the upper, forward corner of a double-sided rocker 31. The latter is journaled on a bushing carried by a pin 32 inserted through an apertured boss 34 and laterally flanking apertured lugs 35 integral with the tractor housing 12 (see also Fig. 3). The rocker 31 is also pivotally connected with the forward end of the link 11 by means of a pin 36 inserted through the rocker and a swiveled ball carried by the link. Since the rocker swings about the pin 32 in response to displacement of the link 11, the translation of the latter effects shifting of the control element 27 in a substantially fore and aft direction.

For absorbing the forward thrust of the link 11 and yet permitting it to be displaced distances proportional to such thrust, a resilient control member is provided, here shown as a coiled compression spring 38 coaxially disposed around the element 27. The spring 38 bears at its forward end against the housing 12, and at its rear end against a cap 39 adapted to be engaged by a transverse web portion 31a extending between opposite sides of the rocker 31. Forward swing of the rocker 31 thus compresses the spring 38 and shoves the control element 27 forward through substantially the same distance that the spring is compressed.

It will be apparent that when the implement C is drawn forwardly in lowered, ground-engaging position, the ground resistance opposing such forward movement tends to rock the implement counterclockwise (Fig. 1). The resulting forward thrust exerted on the link and corresponding in magnitude to the algebraic sum of the moments acting on the implement is balanced by the reactive force of the spring 38.

The hydraulic ram 25 includes a rearwardly opening cylinder 40 having a working piston 41 operatively connected with the rockshaft 24 by a thrust rod 42 which has ball-shaped ends received respectively in sockets formed in the piston and in the lower end of a crank arm 44 rigid with the rockshaft. With this arrangement the admission of fluid under pressure to the forward end of the cylinder 40 forces the piston 31 rearwardly to rock the shaft 24 counterclockwise (Fig. 2) and to swing the links 10 upwardly about their forward pivot connections. Conversely, exhaust of fluid from the cylinder permits the piston to retreat and the hitch links to swing downwardly under the influence of the weight of the implement C or other load.

Pressure fluid is supplied to the cylinder 40 by way of a conduit 45 from a pump 46 which may be driven in well known manner (see Ferguson Patent 2,223,002) from the tractor engine. Preferably the pump 46 is mounted within the center housing 12 which serves as a sump or reservoir for the fluid, such as oil, used in the hydraulic system. Control of the ram 25 by the control element 27 and the quadrant lever 26 is effected through the medium of a valve mechanism comprising, in this instance, a valve plunger 48 tapered on opposite ends and slidable in a sleeve or bushing 49 mounted in the body of the pump 46. This sleeve is formed with two sets of ports including intake or supply ports 50 and smaller exhaust or drain ports 51. The respective sets of ports are spaced apart axially of the sleeve so that both sets may be closed simultaneously by the plunger or either set may be opened while the other is closed. Thus, when the valve plunger 48 is shifted to the left from a central or neutral position to the "raising" position, the supply ports 50 are uncovered and the pump 46 draws fluid from the sump and discharges it under pressure through the conduit 45 into the cylinder 40. When the valve plunger is shifted in the opposite direction to uncover the exhaust ports 51, the intake ports 50 are closed, thus preventing pumping action and permitting fluid to drain from the cylinder 40. When the valve plunger is in its central or neutral position (as shown) both sets of ports are blocked so that no fluid is pumped to the cylinder 40 and none is permitted to escape. Consequently, the hitch linkage is held in fixed position.

In order to effect shifting of the valve plunger 48 in response to positioning of both the quadrant lever 26 and the control element 27, a floating lever 52 is provided. The quadrant lever 26, as shown, is formed integrally with a shaft 54 journaled in the tractor housing and having an eccentric 55 providing a fulcrum for a pad 52a on the upper end of the floating lever. By various settings of the hand lever 26, effecting rotation of the shaft 54, the eccentric 55 is adjusted fore and aft to shift the location of the fulcrum it provides. At its lower end the floating lever 52 is suitably connected with the valve plunger 48. The lever is hinged intermediate its ends, and a spring 56 yieldably restrains the lever portions against jackknifing with respect to each other.

The mechanism is here shown (Fig. 2) in its elevated or transport position. As the piston 41 traveled to the right in raising the implement its skirt 41a has emerged from the cylinder, striking the floating lever 52 to automatically arrest the raising and effect an automatic cut-off of the system. Thus, the piston skirt rocked the floating lever 52 counterclockwise about an intermediate pivot 58, restoring the valve 48 to neutral.

As here shown, the control element 27 is connected with the floating lever 52 by means of a forked link 59 so that the lever follows the movements of the control element. In operation, the quadrant lever 26 is swung forward and down, opening the exhaust ports 51. Upon grounding of the implement an increasing thrust force is applied to the control element 27. As the control element 27 is thus shifted forwardly from its original position illustrated, it swings the lever 52 forwardly about the eccentric 55 as a fulcrum point, thus moving the valve plunger 48 to the left to neutral. And if the draft load increases further it shifts the valve still farther so that the intake ports 50 are opened.

Conversely, when the control element 27 is shifted rearwardly, by a relaxation of the thrust on the link 11, it pulls the lever 52 rearward about the eccentric 55 to shift the valve plunger 48 rearward to neutral, and if the lessening of draft goes beyond that, on into a position in which the outlet ports 51 are opened. The control valve 48 will be in its neutral or mid position (with both sets of ports blocked) when the element 27 is displaced just to the position selected by the setting of the hand lever 26 and corresponding to the draft load desired.

Such positioning of the plunger 48 serves to add pressure fluid to or vent it from the cylinder 40, as explained above, so that the draft links 10 are automatically raised or lowered when the implement is working as the draft forces on it increase or decrease. In soil of substantially uniform texture, the working depth of the implement is thus maintained substantially constant at a value selected by the setting of the quadrant lever 26.

*The attachment for reconstructing the existing system*

In accordance with the present invention, the basic system described above is reconstructed to create an improved system capable of adjustment over a wide range of sensitivities with which the automatic draft control action takes place. Without the bodily changing of one control spring for another, uniform draft control performance for a great variety of implements and soils is achieved. In the realization of such an improved system, a mechanism having an adjustable mechanical advantage is interposed between the top or thrust link and the control spring, so that the apparent strength of the latter may be changed. The spring and the control element are adapted to have freedom for relative movement, that is, the deflection of the former is not fixed with respect to displacement of the latter, but is varied as the mechanical advantage of the mechanism is adjusted. The control element, on the other hand, is operatively connected with the top link by means exclusive of the variable mechanical advantage mechanism, so that the two have proportional displacements regardless of such adjustments in mechanical advantage.

As here shown (Figs. 2, 3, and 4) the variable ratio or variable mechanical advantage mechanism for connecting the link 11 and the spring 38 comprises a bracket 60 adapted to be rigidly mounted on the tractor housing 12. While the bracket may take different forms, that illustrated includes two spaced side-by-side arms 61 which are roughly L-shaped in configuration. And although the bracket 60 may be mounted on the tractor in any suitable manner, the arms 61 are preferably apertured and received on the transverse pin 32 which, as previously described, is inserted through the boss 34 and lugs 35 on the housing 12 (see Fig. 3). The arms are rigidly connected at their lower, aft ends by a cross bolt 62 carrying a spacing sleeve 63; and they are similarly connected at their upper ends by a cross bolt 64 carrying a spacing sleeve 65. The cross bolt 64 may also receive one end of a brace 66 which extends downwardly and forwardly for attachment to the top of the tractor housing 12 by means of bolts and cooperating tapped openings pre-existing there for other uses.

Figure 3:
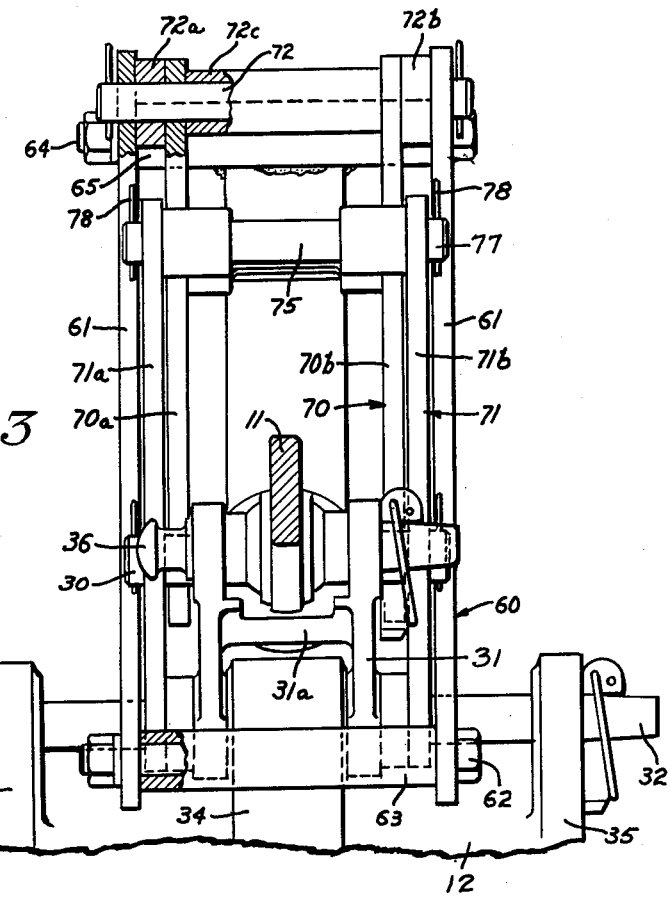
Fig. 3 is a fragmentary rear elevation, partially in section taken substantially along the line 3—3 in Fig. 2.
Figure 4:
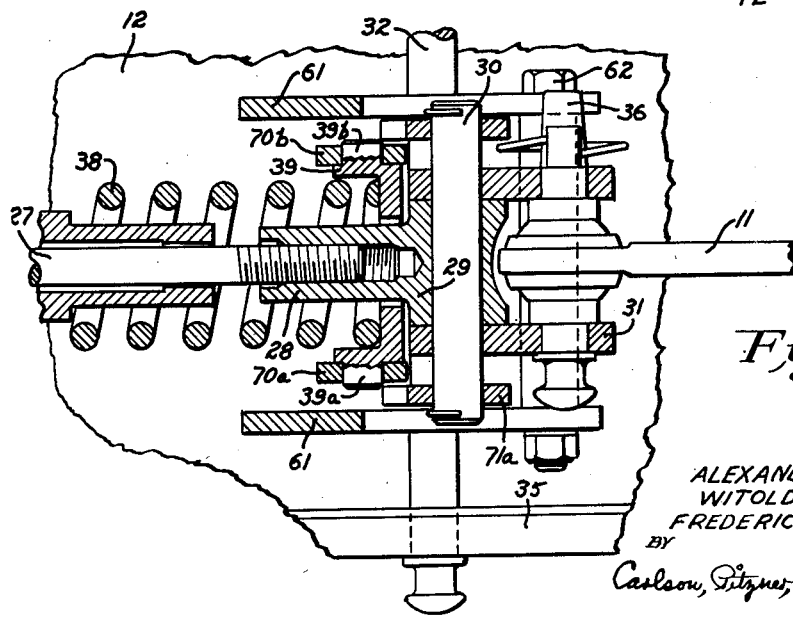
Fig. 4 is a sectional view taken substantially along the line 4—4 in Fig. 2.

A pair of double-sided levers 70 and 71 are operatively connected between the link 11 (in this instance through the rocker 31) and the spring 38 and means are provided for adjusting the mechanical advantage afforded by each such lever. As here shown, the first of these levers 70 is fulcrumed at its upper end to the upper portion of the bracket 60 by means of a transverse pin 72 extending through both sides 70a, 70b of the lever and through alined openings of the side arms 61. Suitable spacers 72a, 72b, and 72c are provided to maintain the sides 70 and 70b properly located from the arms 61 and from each other (Fig. 3). The two sides 70a, 70b of the first lever depend for pivotal connection at their lower ends to respective ones of opposite transverse studs 39a and 39b on a skirt of the cap 39. It is to be noted that the cap 39 is centrally apertured and spaced from the extension 28 so that the two are translatable axially relative to one another.

The second of the two levers 71 includes spaced elongated sides 71a, 71b which are fulcrumed at their lower ends on the pin 32. They are also connected to the rocker 31 by having openings through which the pin 30 is inserted, thus constituting the lever 71 and the rocker 31 a unit swingable about the pin 32.

Figure 2:
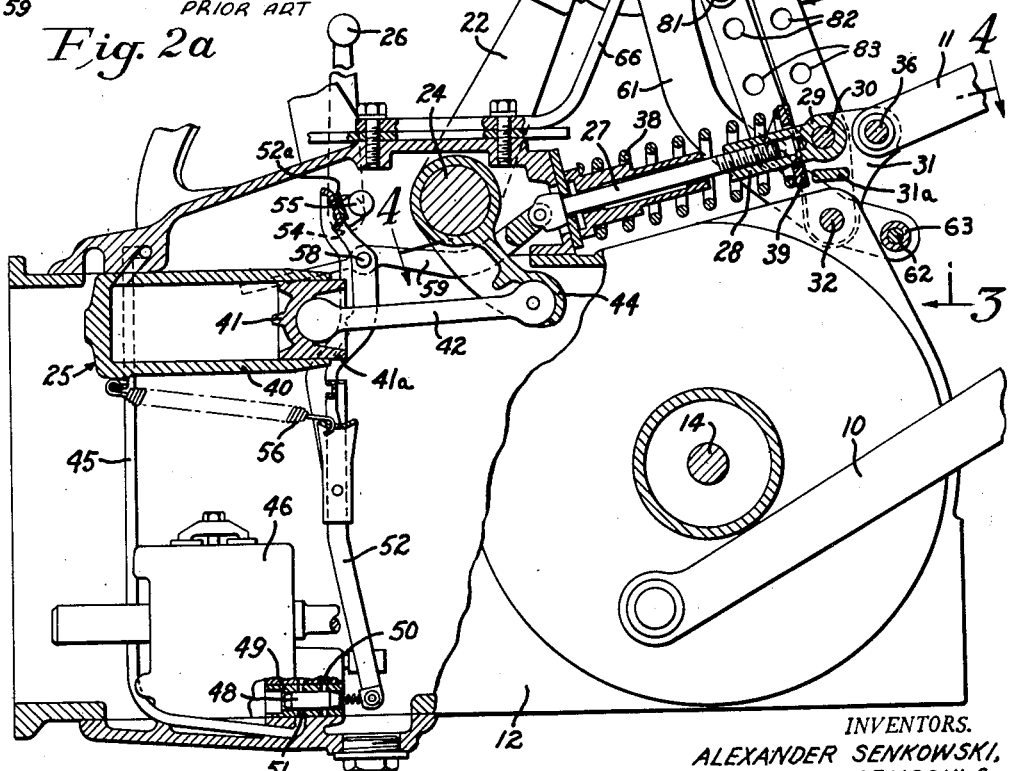
Fig. 2 is an enlarged longitudinal vertical section of a part of the tractor and the improved hitch control system.

The two levers 70 and 71 thus extend in opposite directions from their respective fulcrums in fore and aft juxtaposed relation (Fig. 2). For connecting them to swing in unison, a rigid shackle 75 extends between the two levers, the levers and the shackle being constructed for attachment of the latter at any one of a plurality of points spaced apart longitudinally of the levers so as to vary their mechanical advantage. Preferably, the attachment of the shackle 75 to the respective levers 70, 71 is effected by pins 76, 77 inserted through alined apertures in the levers and at opposite ends of the shackle. Cotter pins 78 secure the pins 76 and 77 in place and permit quick and easy shifting of the shackle, as desired.

In order to change the mechanical advantage of each of the levers, and thus their combined mechanical advantage, provision is made for attaching the shackle 75 at any one of a plurality of locations lengthwise along the levers. For this purpose, each lever is formed with a series of apertures for receiving the shackle-connecting pins 76 and 77, there being three such sets of apertures in the exemplary mechanism designated, respectively, 81, 82, and 83. The apertures are spaced apart longitudinally of the levers at progressively varying distances from the fulcrums thereof. In the case of the lever 70, the aperture 81 is closest and the aperture 83 is farthest from the pivot 72. The apertures are arranged in reverse sequence with relation to the pivot 32 of the second lever 71. Shifting of the connecting shackle 75 from one set of apertures to another will vary the ratio or mechanical advantage of both levers simultaneously and in the same sense. While the exact geometry and spacing of the levers and their pivoted connections may be changed to provide any desired lever ratio, the overall mechanical advantage of the two levers as benefiting the spring in working against thrust of the link 11 may be, for example, 9:1 with the shackle 75 connected between the apertures 81, 4.5:1 with the shackle connected between the apertures 82, and 2.25:1 with the shackle connected between the apertures 83. Such change in mechanical advantage produces the effect of an actual bodily substitution of one spring 38 for another of different strength, i. e., different deflection modulus.

The remaining components of the new system are, in this instance, the same in construction and organization as previously described, that is, they are here shown as part of the existing system.

*Operation of the resulting new system*

The operation of the new system will first be considered by assuming that the shackle 75 is connected between the apertures 81 as here shown. As the quadrant lever 26 is moved forward and down, the implement is lowered into engagement with the ground, the resulting ground reaction forces creating a forward thrust on the link 11, swinging the rocker 31 counterclockwise so that the control element 27 is moved forward until the valve plunger 48 reaches neutral. This also swings the lever 71 counterclockwise about its fulcrum 32, and in turn swings the lever 70 clockwise about its fulcrum 72, causing the cap 39 to compress the spring 38 until its reactive force, acting through the levers, balances the link thrust. It will be appreciated that it is the lever 70 which moves the cap 39 to compress the spring 38, as contrasted with the previously described existing system wherein the web 31a of the rocker 31 engages the cap 39 to compress the spring.

The reactive force of the spring 38 on the lower end of lever 70 is multiplied and exerted on the shackle 75, and still further multiplied and exerted on the pin 30 to resist the forward thrust of the link 11. With an overall lever mechanical advantage of, say, 9:1, the spring 38 need only exert a two hundred pound reactive force to balance an eighteen hundred pound thrust by the link 11. The spring thus appears to be stronger or stiffer than it really is. By contrast, in the system illustrated by Fig. 2A, the spring would have to exert substantially eighteen hundred pounds reaction in order to balance such thrust.

Now, if the draft on the implement changes, the spring reaction will correspondingly change to balance the new thrust value, and the spring deflection will also change. For example, if the draft on the implement increases, the spring is compressed more until it balances such increase. Owing to the mechanical advantage of the levers, the spring need only increase its reaction by one-ninth the increase in thrust, yet the link 11 and the control element 27 will move forward only one-ninth the distance through which the spring is deflected. As a result, the sensitivity of the system, that is, the ratio of the displacement for control element 27 to the thrust necessary to produce such displacement is relatively small even when the spring 38 is relatively weak. For example, the sensitivity of the improved system having a mechanical advantage of 9:1 in favor of the spring is thus less than the sensitivity of the prior art system in Fig. 2a (which has no mechanical advantage) by a ratio of 81:1, assuming the the modulus of the spring in each case is the same.

It will be understood that such forward displacement of the control element 27 pivots the floating lever about the eccentric 55 under the influence of the spring 56, so that the plunger is moved to uncover the supply ports 50. As a result, the ram 25 acts to raise the implement, making it run shallower, until the draft load on it is decreased to the point that the thrust on the link 11 is restored to its original value.

When it is desired to increase the sensitivity of the system, it is only necessary to remove the shackle 75 and reconnect it either between the apertures 82 or 83. This serves to reduce the mechanical advantage afforded by the levers 70 and 71 in favor of the spring 38. Accordingly, when the draft control action is taking place, a change in the thrust on the link 11 requires a proportionally greater change in reactive force by the spring.

Assuming that the shackle 75 is connected between the apertures 82 to provide a mechanical advantage of 4.5:1, just half that taken by way of example in the first case with the shackle connected between the apertures 81, the same change in thrust in the latter case will necessitate a change twice as great, or two-ninths the thrust change, in the reactive spring force compared to that required in the first case. Since the spring modulus remains constant, the deflection of the spring 38 must be twice as great in the second case. But because the mechanical advantage of the levers is half that in the first case, the displacement of the control element 27 compared to the deflection of the spring is twice as great in the second case, i. e., in the proportion of 2:9. Therefore, the total displacement of the control element 27 is four times greater in the second case than in the first case, for the same change in thrust. Manifestly, the sensitivity of the system is thus increased fourfold simply by halving the mechanical advantage afforded by the combined levers 70 and 71. And from the foregoing analysis, it will be seen that there is an exponential relation between the sensitivity and mechanical advantage, i. e. the sensitivity of the system varies inversely as the square of the value of the mechanical advantage of the spring over the thrust link. For example, if the levers have an overall mechanical advantage of 2.25 when the shackle is connected between the apertures 83, i. e., one-fourth that of the position shown, then the sensitivity of the system will be sixteen times greater.

For a given range of possible mechanical advantages, in this instance the possible distance the shackle is adjustable lengthwise along the levers 70 and 71, the range of sensitivity changes its greatly increased over that heretofore obtainable. Yet, the new system having such a wide range of sensitivity is susceptible of practice and embodiment by relatively simple and economical components, as exemplified by the form herein described, to reconstruct basic or existing draft control systems. While it has been proposed in the past that sensitivity adjustments in automatic draft control systems migh be effected by employing a mechanism susceptible of changes in its mechanical advantage, none has been effective to afford sensitivity changes varying exponentially with such changes in mechanical advantage. As hereing described and illustrated, the present invention not only makes possible wide changes in sensitivity, accommodating with optimum performance a great variety of implements under diverse soil conditions, by simply removing and reconnecting a shackle, but also leaves the geometry of the system unchanged as the shackle is repositioned.

We claim as our invention:

1. In a tractor having a hitch including a thrust link for transmitting a force varying in magnitude with the sum of moments tending to rock an implement about a pivotal connection to the hitch, such moments being occasioned by the weight of the implement and ground reaction forces on the implement, and a hitch control system including a shiftable control element for automatically raising and lowering the hitch to maintain said force substantially constant; a spring member carried on the tractor, a mechanism of variable mechanical advantage connected between said thrust link and said spring member such that the latter yieldably absorbs forces exerted by the former, and said thrust link and said control element being connected for movement in unison whereby the sensitivity of said hitch control system varies inversely as the square of the value of the mechanical advantage in favor of the spring over the thrust link.

2. In a tractor having a hitch including a thrust link and a hitch control system including a shiftable control element, the combination comprising a resilient control member, a mechanism including means for adjusting its mechanical advantage connected between said resilient member and said thrust link, and means for directly connecting said thrust link and control element to be displaced in sympathy while leaving the resilient member free to deflect through different distances, relative to the displacement of said control element, as said mechanical advantage is adjusted, whereby the sensitivity relation between said thrust link and said control element varies inversely as the square of the adjusted value of the mechanical advantage of said mechanism.

3. In a draft control system for a tractor implement hitch, the combination with a pivoted rocker adapted to receive thrust from an implement and having a slidably displaceable control element connected directly thereto, of a control spring, and means for applying stress to said spring from said rocker with a selectively variable mechanical advantage, said last-named means being constructed and arranged to permit said spring to be deflected through distances which are different from the displacements of said control element.

4. In a draft control system for a tractor implement hitch, the combination of a compression spring, a translatable thrust link, a mechanism including means for adjusting its mechanical advantage connected between said spring and said link, whereby a given change in thrust on said link compresses said spring an amount varying with adjustments in said mechanical advantage of said mechanism, the resultant translation of said thrust link thereby varying inversely as the square of the adjusted value of said mechanical advantage in favor of said spring for such given change in thrust, a shiftable control element and means connecting the same to be displaced in a constant direct proportion to the translation of said thrust link regardless of the adjusted value of said mechanical advantage.

5. In a draft control system for a tractor implement hitch, the combination comprising a thrust link adapted to transmit forces varying with draft on an implement, a shiftable control element including means for connecting it for displacement in unison with said link, a control spring, a mechanism including means for adjusting its mechanical advantage, and means for connecting said mechanism between said link and spring such that the deflection of said spring may vary with respect to the displacement of said control element whereby the sensitivity of the control system varies inversely as the square of the adjusted value of the mechanical advantage in favor of the spring.

6. In a draft control system for a tractor implement hitch, the combination of a rocker adapted to be pivoted on the tractor, a thrust link connected between said rocker and an implement carried by the tractor hitch, a control element connected directly to said rocker to be displaced upon swinging of the latter, a control spring, and means exclusive of said control element and including levers adjustable in mechanical advantage connected between said rocker and said spring to stress the latter in response to forces exerted on said rocker by said link, the deflection of said spring for a given force varying substantially proportionally with the adjusted value of said mechanical advantage, and the displacement of said control element for such given force varying inversely as the square of the adjusted value of said mechanical advantage in favor of the spring.

7. In a tractor having a shiftable control element connected with the thrust link of an implement hitch so that the control element is shifted by movement of the thrust link due to thrust forces in the latter, means for adjustably determining the extent of movement of said control element for a given thrust force exerted on said thrust link comprising in combination, a pair of levers pivotally mounted on the tractor, means connecting said levers to swing in unison and adjustable to vary the mechanical advantage of each lever, a resilient element mounted on the tractor and connected with the first of said levers to oppose its swing in one direction, and means for operatively connecting said thrust link and said control element to the second of said levers such that thrust exerted by said link is opposed by said resilient element acting through said two levers, adjustments of said lever-connecting means thereby changing the thrust sensitivity with which said control element is moved without affecting the displacement ratio between said thrust link and said control element.

8. In a tractor having a shiftable control element and an implement hitch including a thrust link, a coupling for connecting the top link to shift the control element through different distances for a given magnitude of force exerted on said thrust link comprising, in combination, a bracket mountable on the tractor, a pair of levers adapted to be fulcrumed at respectively opposite ends thereof to said bracket, means for connecting said levers to swing in unison and adjustable to vary the mechanical advantage of each lever, a resilient control member connected to a first of said levers to oppose its swinging movement in one direction, and means for connecting said control element and the second of said levers to be displaced in unison with said thrust link, adjustments of said lever-connecting means thereby varying the ratio of displacements for said thrust link and said resilient member without affecting the displacement ratio for said thrust link and control element.

9. In a tractor having a power actuated rear implement hitch including a thrust link for transmitting a draft-controlling thrust from an implement to a shiftable control element on the tractor, that improvement comprising, in combination, a pair of juxtaposed levers pivoted at respectively opposite ends thereof on the tractor, means for connecting said levers to swing in unison including a shackle adjustable in position lengthwise along the levers, a control spring carried by the tractor and connected to resiliently oppose swinging of a first of said levers in one direction, a rocker pivoted on the tractor and connected directly with said control element and the second of said levers, and means for connecting said thrust link to said rocker, draft thrusts by said thrust link being opposed with adjustable sensitivity by said spring acting through said levers and such sensitivity adjustments leaving the displacement ratio of said thrust link and said control element constant.

10. In a tractor having a power elevatable rear implement hitch including a forwardly extending thrust link actuated by a force corresponding in magnitude to the sum of the moments acting on an implement pivotally connected to the hitch and tending to rock the implement fore and aft about the hitch, a shiftable control element on the tractor connected to said thrust link to be moved in a substantially fore and aft direction in response to such rocking of the implement, a pair of juxtaposed levers pivoted at the respectively opposite ends thereof to the tractor, means positionable lengthwise along said levers for connecting them to swing in unison with adjustable mechanical advantages, a control spring engaged at one end with the tractor and at the other end with a first of said levers to oppose its swing in one direction, and means connecting said thrust link to exert its forces on the second of said levers, said spring thereby opposing the movement of said thrust link with an adjustable ratio of displacement for the spring and link in acting through said levers, such adjustments leaving the connection between said thrust link and said control element and their displacement ratio unaffected.

11. In an automatic draft control system for a tractor, the combination comprising a pair of draft links pivoted for vertical swing relative to the tractor and adapted to carry an implement pivoted for rocking in fore and aft directions, a hydraulic ram operatively connected to raise or lower said draft links upon the supplying to or draining of pressure fluid from it, a fluid pump, a shiftable control valve connected with said pump and ram for supplying pressure fluid to or draining it from the ram, a shiftable control element operatively connected with said valve, a thrust link operatively connected with said control element and adapted for connection with the implement to transmit forces varying with draft on the implement, a compression spring on the tractor, a mechanism susceptible of adjustment in mechanical advantage interposed between said thrust link and spring, said spring and control element having freedom for relative movement such that the deflection of the former may be different in magnitude from the displacement of the latter, whereby a given force in said thrust link is balanced by a deflection of said spring and the corresponding displacement of said control element actuates said valve to restore the force to its original value, and adjustments in said mechanical advantage provide a displacement of said control element which varies inversely as the square of the change in mechanical advantage in favor of the spring for the same given force, thus varying the sensitivity of the system over a wide range.

12. In an automatic draft control system for a tractor, the combination comprising a pair of draft links adapted to carry an implement pivoted about a transverse axis for fore and aft rocking, an actuator operatively connected to raise or lower said draft links and implement, control means for energizing said actuator, a shiftable control element operatively connected with said control means, a thrust link connected to translate said control element in unison therewith and adapted for connection with said implement for translation in response to draft forces on it, a resilient control member, a variable mechanical advantage mechanism connected between said thrust link and said resilient control member whereby the latter is deflected to reactively balance forces exerted by said thrust link, said resilient member and said control element having freedom for deflection and displacement, respectively, relative to one another, variations in said mechanical advantage thereby providing for exponentially related changes in the sensitivity of the system.

References Cited in the file of this patent

UNITED STATES PATENTS

| | | |
|---|---|---|
| 1,379,836 | Rackham | May 31, 1921 |
| 2,039,495 | Schlosser | May 5, 1936 |
| 2,087,885 | Fleischel | July 27, 1936 |
| 2,281,605 | Smith | May 5, 1942 |
| 2,721,509 | Klemm et al. | Oct. 25, 1955 |